(12) United States Patent
Chen et al.

(10) Patent No.: US 12,044,868 B2
(45) Date of Patent: Jul. 23, 2024

(54) WAVELENGTH CONVERSION DEVICE AND MANUFACTURING METHOD THEREOF

(71) Applicant: Coretronic Corporation, Hsin-Chu (TW)

(72) Inventors: I-Hua Chen, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 258 days.

(21) Appl. No.: 17/236,996

(22) Filed: Apr. 21, 2021

(65) Prior Publication Data

US 2021/0341656 A1 Nov. 4, 2021

(30) Foreign Application Priority Data

Apr. 29, 2020 (CN) .......................... 202010353868.5

(51) Int. Cl.
*G02B 5/20* (2006.01)
*G02B 1/11* (2015.01)

(52) U.S. Cl.
CPC . *G02B 5/20* (2013.01); *G02B 1/11* (2013.01)

(58) Field of Classification Search
CPC .......... G03B 21/204; G02B 1/11; G02B 5/20; H05B 33/10
See application file for complete search history.

(56) References Cited

U.S. PATENT DOCUMENTS

| 4,188,449 A | 2/1980 | Lu et al. |
| 2013/0257264 A1* | 10/2013 | Tamaki ................... B05D 5/06 313/503 |

(Continued)

FOREIGN PATENT DOCUMENTS

| CN | 103367611 | 10/2013 |
| CN | 207320161 | 5/2018 |

(Continued)

OTHER PUBLICATIONS

"Office Action of China Counterpart Application", issued on Mar. 16, 2022, p. 1-p. 10.

(Continued)

*Primary Examiner* — Jia X Pan
(74) *Attorney, Agent, or Firm* — JCIPRNET

(57) ABSTRACT

The invention relates to a wavelength conversion device and a manufacturing method thereof. The manufacturing method includes: mixing a fluorescent material, a binding material, and a solvent to form a mixed solution. The volume percentage concentration of the fluorescent material is about 50% to 80%, the volume percentage concentration of the binding material is 10% to 40%, and the volume percentage concentration of the solvent is 10% to 30%. The mixed solution is coated on the substrate. A heat treatment is performed on the mixed solution at a first temperature to form a wavelength conversion layer. The first temperature is higher than the boiling point of the solvent, and the wavelength conversion layer has a porosity of 10% to 30%. The wavelength conversion device manufactured by the manufacturing method of the invention has better toughness, and may provide stable optical quality and improve image brightness.

22 Claims, 2 Drawing Sheets

(56) References Cited

U.S. PATENT DOCUMENTS

| | | | |
|---|---|---|---|
| 2016/0054486 A1* | 2/2016 | Isojima | G02B 5/0226 |
| | | | 362/330 |
| 2017/0030556 A1* | 2/2017 | Shirakawa | F21K 9/64 |
| 2017/0168379 A1* | 6/2017 | Hashizume | G02B 5/3083 |
| 2018/0233637 A1 | 8/2018 | Taruki et al. | |
| 2019/0171093 A1* | 6/2019 | Furuyama | G02B 5/0226 |
| 2019/0273190 A1* | 9/2019 | Tsutai | C09K 11/7706 |
| 2020/0251620 A1* | 8/2020 | Johnston | H01L 33/501 |

FOREIGN PATENT DOCUMENTS

| | | | |
|---|---|---|---|
| CN | 108474543 | | 8/2018 |
| CN | 209327769 | | 8/2019 |
| CN | 209327769 U | * | 8/2019 |
| CN | 209327770 | | 8/2019 |
| JP | 2014029928 | | 2/2014 |
| TW | 201236214 | | 9/2012 |

OTHER PUBLICATIONS

"Office Action of China Counterpart Application", issued on Dec. 2, 2022, p. 1-p. 10.

* cited by examiner

WAVELENGTH CONVERSION DEVICE AND MANUFACTURING METHOD THEREOF

CROSS-REFERENCE TO RELATED APPLICATION

This application claims the priority benefit of China application serial no. 202010353868.5, filed on Apr. 29, 2020. The entirety of the above-mentioned patent application is hereby incorporated by reference herein and made a part of this specification.

BACKGROUND OF THE INVENTION

Field of the Invention

The invention relates to an optical device and a manufacturing method thereof, and particularly relates to a wavelength conversion device and a manufacturing method thereof.

Description of Related Art

The wavelength conversion layer (for example, fluorescent ceramic sheet) is generally formed by compression molding, so it has extremely low porosity (less than 3%), making it more brittle and less tough. The wavelength conversion layer produced in this way is readily cracked during the production process, and may not be attached to a substrate having a curved surface. Furthermore, when a projector using this wavelength conversion layer is a high-power projector, the heat energy generated by the wavelength conversion layer may cause a thermal shock effect due to a denser structure, thus causing cracking. In addition, since the manufacturing process of the wavelength conversion layer in the prior art is relatively complicated, the quality of the wavelength conversion layer of different batches is different, thus making the brightness of the emitted light beam to be varied more greatly.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a manufacturing method of a wavelength conversion device. The manufactured wavelength conversion layer has better toughness, and a projector using the wavelength conversion device has stable optical quality and improves image brightness.

The invention provides a wavelength conversion device, wherein the wavelength conversion layer has better toughness.

Other objects and advantages of the invention may be further understood from the technical features disclosed by the invention.

In order to achieve one, some, or all the above objects or other objects, an embodiment of the invention provides a manufacturing method of a wavelength conversion device, including the following steps. A fluorescent material, a binding material, and a solvent are mixed to form a mixed solution. A volume percentage concentration of the fluorescent material is 50% to 80%, a volume percentage concentration of the binding material is 10% to 40%, and a volume percentage concentration of the solvent is 10% to 30%. The mixed solution is coated on a substrate. A heat treatment is performed on the mixed solution at a first temperature to form a wavelength conversion layer. The first temperature is higher than a boiling point of the solvent, and the wavelength conversion layer has a porosity of 10% to 30%.

In order to achieve one, some, or all the above objects or other objects, an embodiment of the invention provides a wavelength conversion layer including a substrate and a wavelength conversion layer. The wavelength conversion layer is disposed on the substrate. The wavelength conversion layer includes a fluorescent material and a binding material, and has a porosity of 10% to 30%.

Based on the above, the embodiments of the invention have at least one of the following advantages or effects. The wavelength conversion layer of an embodiment of the invention has a larger porosity (10% to 30%). Therefore, when the wavelength conversion layer is subjected to external impact or collision, fine cracks are less likely to spread. The wavelength conversion layer has better toughness, and is less likely to crack when attached to a curved surface. In addition, the manufacturing process of the wavelength conversion device of the present embodiment is simple, and a projector using a wavelength conversion layer of an embodiment of the invention may have more stable optical quality and improve image brightness.

In order to make the above features and advantages of the invention better understood, embodiments are specifically provided below with reference to figures for detailed description as follows.

Other objectives, features and advantages of the present invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, explain the principles of the invention.

DESCRIPTION OF THE EMBODIMENTS

Figure 1:
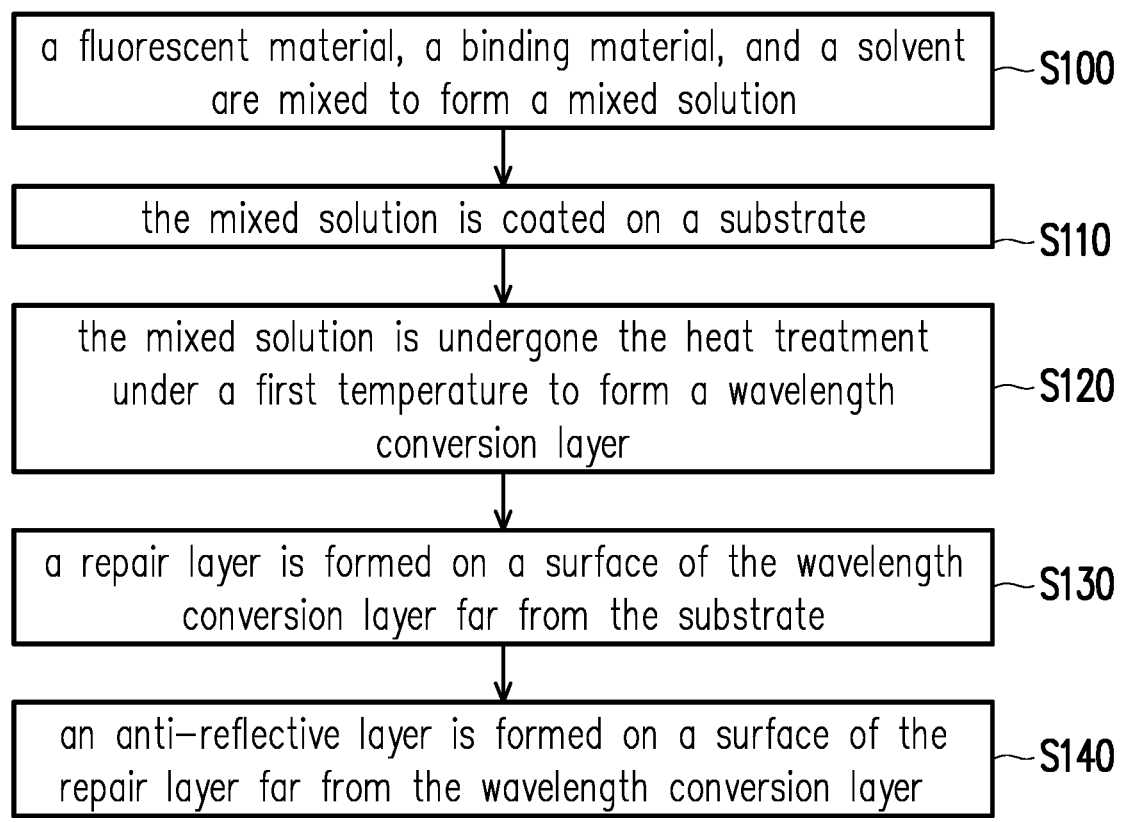
FIG. 1 is a flowchart of a manufacturing method of a wavelength conversion device of an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Hereinafter, reference will be made in detail to exemplary embodiments of the invention, and examples of the exemplary embodiments are illustrated in the figures. Wherever possible, the same reference numerals are used in the figures and the descriptions to refer to the same or similar portions. The invention may also be embodied in various forms, and should not be limited to the embodiments described herein. The thickness of layers and regions in the figures is exaggerated for clarity. The same or similar reference numerals indicate the same or similar elements, which are not repeated in the following paragraphs. In addition, the terminology mentioned in the embodiments, such as: up, down, left, right, front, rear, etc., are only directions referring to the figures. Therefore, the directional terms used are for illustration, not for limiting the invention.

FIG. 1 is a flowchart of a manufacturing method of a wavelength conversion device of an embodiment of the invention.

Referring to FIG. 1, in step S100, a fluorescent material, a binding material, and a solvent are mixed to form a mixed solution. In some embodiments, the proportion of the fluorescent material, the binding material, and the solvent in the mixed solution is as follows: the volume percentage concentration of the fluorescent material is 50% to 80%, the volume percentage concentration of the binding material is 10% to 40%, and the volume percentage concentration of the solvent is 10% to 30%. Specifically, the volume percentage concentration of the fluorescent material is, for example, 50%, 65%, or 80%. The volume percentage concentration of the binding material is, for example, 10%, 15%, 20%, 30%, or 40%. For example, the volume percentage concentration of the solvent is 10%, 15%, 20%, 25%, or 30%. The fluorescent material may be, for example, an inorganic fluorescent material, which is not limited in the invention. In some embodiments, the fluorescent material includes a plurality of fluorescent particles. In a further embodiment, the particles of the fluorescent material have a particle size of 5 μm to 30 μm, for example. The binding material may also be an inorganic material, for example. For example, the binding material may include glass, ceramic, or a combination thereof. In some embodiments, the binding material may be in powder form, and the particles of the powder material have a particle size of 0.5 μm to 5 μm. In some embodiments, the solvent includes an ester solvent. For example, the solvent may include ethyl acetate, butyl acetate, ether acetate, or a combination thereof, but the invention is not limited thereto.

In step S110, the mixed solution is coated on a substrate. In some embodiments, the method for coating the mixed solution on the substrate may include, for example, a screen-printing method, a dispensing method, a knife coating method, or a spray coating method, which is not limited in the invention.

In step S120, a heat treatment is performed on the mixed solution at a first temperature to form a wavelength conversion layer. In some embodiments, the heat treatment may be sintered in a stepwise heating manner, for example, in an atmospheric environment, so that the solvent is volatilized from the mixed solution. The first temperature needs to be at least higher than the boiling point of the solvent. In some embodiments, the first temperature may be 500° C. to 1700° C., but the invention is not limited in this regard. After the heat treatment is performed on the mixed solution, the binding material may be melted and deformed to form a wavelength conversion layer having a plate-like structure by bonding the fluorescent material and the substrate. In addition, the solvent is volatilized during the heat treatment process, and therefore many pores may be generated in the wavelength conversion layer. In some embodiments, the wavelength conversion layer has a porosity of 10% to 30%. For example, the porosity may be 10%, 15%, 20%, 25%, or 30%. In the present embodiment, the proportion of the fluorescent material and the solvent in the mixed solution affects the porosity of the wavelength conversion layer. In detail, the greater the proportion of the fluorescent material in the mixed solution, that is, the mixed solution contains more fluorescent particles, the more pores are generated between the plurality of fluorescent particles, so that the wavelength conversion layer has a larger porosity. In addition, if the proportion of the solvent in the mixed solution is greater, that is, the mixed solution contains more solvent, after the mixed solution is heat-treated, since more pores are left or the pore volume is larger due to the volatilization of the solvent, the wavelength conversion layer has a larger porosity. In addition, the particle size of the particles of the fluorescent material may also affect the porosity of the wavelength conversion layer. In detail, the larger the particle size of the particles of the fluorescent material, the larger the pores generated between adjacent fluorescent particles, so that the wavelength conversion layer has a larger porosity.

Based on this, the wavelength conversion layer of the present embodiment has a larger porosity (e.g., 10% to 30%) compared to the porosity of the wavelength conversion layer of the prior art (e.g., less than 3%). Therefore, when the wavelength conversion layer is subjected to external impact or collision, fine cracks are less likely to spread. Furthermore, the pores in the wavelength conversion layer may be used to buffer impacts or collisions, so that the wavelength conversion layer has better toughness, and therefore cracks are less likely to develop when the wavelength conversion layer is attached to a curved surface.

After step S120, the following steps may be optionally performed as needed, but the invention is not limited thereto.

Please continue to refer to FIG. 1, in step S130, a filling layer is formed on the surface of the wavelength conversion layer away from the substrate. In some embodiments, due to the volatilization of the solvent, the surface of the wavelength conversion layer may have uneven holes. In step 130, a filling layer may be formed on the surface of the wavelength conversion layer away from the substrate to fill the holes. This step 130 may include, for example, coating a filling material on the surface of the wavelength conversion layer away from the substrate. In some embodiments, the filling material is an inorganic material. For example, the filling material may be glass frit or glass solution, which is not limited in the invention. Step 130 may further include, for example, performing a heat treatment on the filling material at a second temperature to cure the filling material to form a filling layer. In a further embodiment, the second temperature may be equal to or lower than the first temperature. For example, the second temperature may be 500° C. to 1700° C.

In some embodiments, the filling layer has a greater transmittance for visible light, for example, to avoid affecting the light conversion efficiency of the wavelength conversion layer. The filling layer fills the holes on the surface of the wavelength conversion layer, so when a laser light source (not shown) emits a laser beam to the wavelength conversion layer, energy is less likely to be accumulated in the filling layer, thereby improving the optical conversion rate of the wavelength conversion layer. Furthermore, the filling layer has good flatness, so that components to be formed later may be better disposed on the surface of the wavelength conversion layer away from the substrate. In a further embodiment, the filling layer is denser than the wavelength conversion layer. For example, the filling layer may have a porosity of less than 3%. In some embodiments, the filling layer may have a thickness of 3 μm to 15 μm.

In step S140, an anti-reflection layer is formed on the surface of the filling layer away from the wavelength conversion layer. In some embodiments, the anti-reflection layer may be formed by coating a thin film with lower reflectance on the surface of the filling layer. Accordingly, the reflectance of the laser beam emitted by the laser light source may be reduced, so that laser beams incident from different angles may all be effectively transmitted to the wavelength conversion layer, thereby improving the light conversion efficiency of the wavelength conversion layer.

Although the manufacturing method of the wavelength conversion device of the present embodiment is described by taking the above method as an example, the manufacturing method of the wavelength conversion device of the invention is not limited thereto.

The following provides some exemplary embodiments to explain the difference between the wavelength conversion devices of the present embodiment and the prior art. In the wavelength conversion device of an embodiment of the invention and the wavelength conversion device of the prior art, the wavelength conversion layer is designed to obtain white light, green light, and yellow light after excitation with blue light. For example, three different fluorescent materials may be disposed in the wavelength conversion devices.

Table 1 provides the white light brightness, green light brightness, and yellow light brightness in the wavelength conversion devices of a plurality of embodiments of the invention. Table 2 provides the maximum brightness difference of the wavelength conversion device of each embodiment. Table 3 provides the white light brightness, green light brightness, and yellow light brightness of wavelength conversion devices of a plurality of prior art. Table 4 provides the maximum brightness difference of the wavelength conversion device of each prior art.

TABLE 1

| Wavelength conversion device of the invention | White light brightness | Green light brightness | Yellow light brightness |
|---|---|---|---|
| First embodiment | 110.1% | 119.5% | 107.4% |
| Second embodiment | 112.0% | 121.5% | 108.6% |
| Third embodiment | 111.5% | 120.2% | 107.8% |
| Fourth embodiment | 110.5% | 119.1% | 108.0% |
| Fifth embodiment | 111.8% | 120.5% | 108.7% |

TABLE 2

| Wavelength conversion device of the invention | White light brightness | Green light brightness | Yellow light brightness |
|---|---|---|---|
| Maximum brightness difference | 1.9% | 2.4% | 1.3% |

TABLE 3

| Wavelength conversion device of prior art | White light brightness | Green light brightness | Yellow light brightness |
|---|---|---|---|
| First prior art | 108.0% | 119.8% | 104.8% |
| Second prior art | 110.3% | 120.7% | 107.3% |
| Third prior art | 108.2% | 113.1% | 106.7% |
| Fourth prior art | 113.1% | 121.6% | 111.6% |
| Fifth prior art | 112.3% | 119.1% | 111.0% |

TABLE 4

| Wavelength conversion device of prior art | White light brightness | Green light brightness | Yellow light brightness |
|---|---|---|---|
| Maximum brightness difference | 5.1% | 8.5% | 6.8% |

As may be seen from Table 1 to Table 4, in the prior art, the maximum image brightness difference produced by a projector using the wavelength conversion device is at least greater than 5%. In contrast, the wavelength conversion layer of an embodiment of the invention has a larger porosity (10% to 30%), and the manufacturing method is simple. According to an embodiment of the invention, when multiple batch productions are performed, projectors using wavelength conversion layers produced in different batches may have similar brightness (less than 3% brightness difference), so that the projector has stable quality and improves image brightness.

Figure 2:
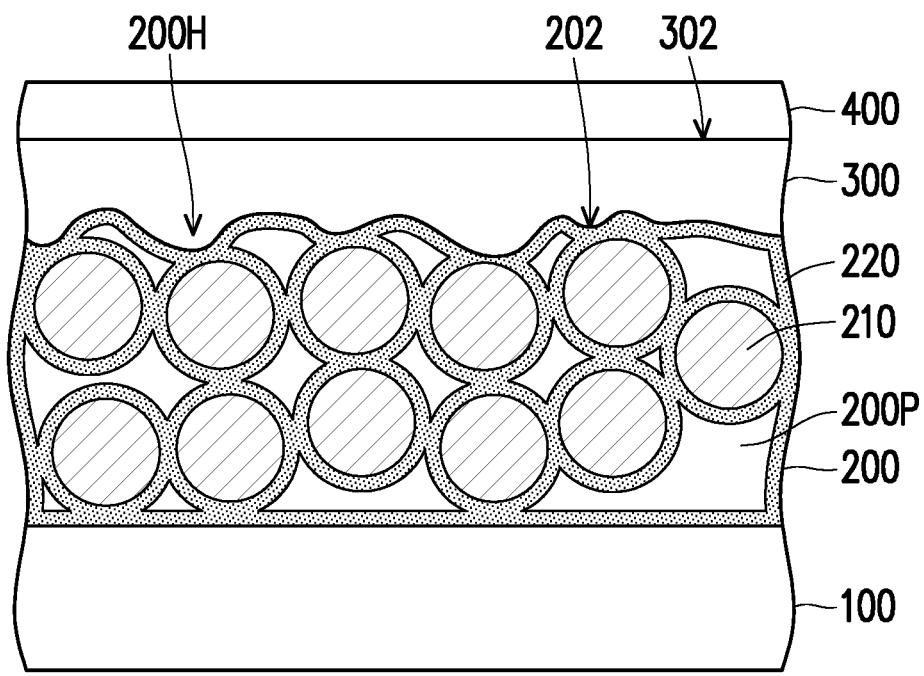
FIG. 2 is a partial cross-sectional view of a wavelength conversion device of an embodiment of the invention.

FIG. 2 is a partial cross-sectional view of a wavelength conversion device of an embodiment of the invention. The embodiment of FIG. 2 adopts a portion of the content of the embodiment of FIG. 1, and the description of the same technical content is omitted. For the description of the omitted portion, reference may be made to the description and effects of the above embodiments, which are not repeated in the following embodiments. In addition, the same or similar reference numerals are used in FIG. 2 to denote the same or similar elements.

Referring to FIG. 2, a wavelength conversion device 10 of the present embodiment includes a substrate 100, a wavelength conversion layer 200, a filling layer 300, and an anti-reflection layer 400. In some embodiments, the material of the substrate 100 may be aluminum, aluminum alloy, copper, copper alloy, aluminum nitride, or silicon carbide, for example, to achieve good thermal conductivity and heat resistance. The wavelength conversion layer 200 is disposed on the substrate 100, for example. In some embodiments, the wavelength conversion layer 200 includes an upper fluorescent material 210 and a binding material 220, wherein the fluorescent material 210 accounts for 50% to 80% of the volume of the wavelength conversion layer 200. For example, the volume percentage of the fluorescent material 210 in the wavelength conversion layer 200 is, for example, 50%, 65%, or 80%. The binding material 220 accounts for 10% to 40% of the volume of the wavelength conversion layer 200. For example, the volume percentage of the binding material 220 in the wavelength conversion layer 200 is, for example, 10%, 15%, 20%, 30%, or 40%. Further, the particles of the fluorescent material 210 have a particle size of 5 µm to 30 µm, and the particles of the binding material 220 have a particle size of 0.5 µm to 5 µm. A surface 202 of the wavelength conversion layer 200 away from the substrate 100 has, for example, a plurality of holes 200H. This is because the solvent originally occupying the holes 200H is subjected to heat treatment during the manufacturing process of the wavelength conversion layer 200 and is volatilized. In addition, the wavelength conversion layer 200 also has a plurality of pores 200P, and the wavelength conversion layer 200 has a porosity of 10% to 30%. The filling layer 300 is disposed on, for example, the surface 202 of the wavelength conversion layer 200 away from the substrate 100 to fill the holes 200H. In some embodiments, the filling layer 300 has a porosity of less than 3% and a thickness of 3 µm to 15 µm. The anti-reflection layer 400 is disposed on a surface 302 of the filling layer 300 away from the wavelength conversion layer 200, for example, to reduce the reflectance of the laser beam emitted by the laser light source when the laser beam is emitted to the wavelength conversion device 10.

It should be noted that although the wavelength conversion device 10 of the present embodiment above includes the substrate 100, the wavelength conversion layer 200, the filling layer 300, and the anti-reflection layer 400, the invention is not limited thereto. For example, a reflective layer may further be disposed between the substrate 100 and the wavelength conversion layer 200 to reflect the light beam passing through the wavelength conversion layer 200 back to the wavelength conversion layer 200, thereby improving the light conversion efficiency of the wavelength conversion layer 200. Alternatively, the wavelength conversion device may also not include the filling layer 300 and the anti-reflection layer 400.

Based on the above, the embodiments of the invention have at least one of the following advantages or effects. The wavelength conversion layer of an embodiment of the invention has a larger porosity (10% to 30%), therefore, when the wavelength conversion layer is subjected to external impact or collision, fine cracks are less likely to spread. The wavelength conversion layer has better toughness, and is less likely to crack when attached to a curved surface. In addition, the manufacturing process of the wavelength conversion device of the present embodiment is simple, and a projector using a wavelength conversion module of an embodiment of the invention may have more stable optical quality and improve image brightness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A manufacturing method of a wavelength conversion device, wherein the manufacturing method comprises:
   mixing a fluorescent material, a binding material, and a solvent to form a mixed solution, wherein a volume percentage concentration of the fluorescent material is 50% to 80%, a volume percentage concentration of the binding material is 10% to 40%, and a volume percentage concentration of the solvent is 10% to 30%;
   coating the mixed solution on a substrate; and
   performing a heat treatment on the mixed solution at a first temperature to form a wavelength conversion layer, wherein the first temperature is higher than a boiling point of the solvent, and the wavelength conversion layer has a porosity of 10% to 30%.

2. The manufacturing method of the wavelength conversion device of claim 1, wherein the binding material comprises glass, ceramic, or a combination thereof.

3. The manufacturing method of the wavelength conversion device of claim 1, wherein the solvent comprises an ester solvent.

4. The manufacturing method of the wavelength conversion device of claim 3, wherein the ester solvent comprises ethyl acetate, butyl acetate, ether acetate, or a combination thereof.

5. The manufacturing method of the wavelength conversion device of claim 1, wherein a method of coating the mixed solution on the substrate comprises performing a screen-printing method, a dispensing method, a knife coating method, or a spray coating method.

6. The manufacturing method of the wavelength conversion device of claim 1, wherein the first temperature is 500° C. to 1700° C.

7. The manufacturing method of the wavelength conversion device of claim 1, wherein the heat treatment is performed on the mixed solution in an atmospheric environment.

8. The manufacturing method of the wavelength conversion device of claim 1, wherein the fluorescent material has a particle size of 5 μm to 30 μm, and the binding material has a particle size of 0.5 μm to 5 μm.

9. The manufacturing method of the wavelength conversion device of claim 1, wherein the volume percentage concentration of the fluorescent material is 65%.

10. The manufacturing method of the wavelength conversion device of claim 1, wherein the volume percentage concentration of the binding material is 15%, 20%, or 30%.

11. The manufacturing method of the wavelength conversion device of claim 1, wherein the volume percentage concentration of the solvent is 15%, 20%, or 25%.

12. The manufacturing method of the wavelength conversion device of claim 1, further comprising, after the heat treatment is performed on the mixed solution at the first temperature, forming a filling layer on a surface of the wavelength conversion layer away from the substrate.

13. The manufacturing method of the wavelength conversion device of claim 12, wherein the step of forming the filling layer comprises:
    coating a filling material on the surface of the wavelength conversion layer away from the substrate; and
    performing the heat treatment on the filling material at a second temperature, wherein the second temperature is equal to or lower than the first temperature.

14. The manufacturing method of the wavelength conversion device of claim 13, wherein the filling material comprises glass.

15. The manufacturing method of the wavelength conversion device of claim 12, wherein the filling layer has a porosity of less than 3% and a thickness of 3 μm to 15 μm.

16. The manufacturing method of the wavelength conversion device of claim 12, further comprising, after the filling layer is formed on the surface of the wavelength conversion layer away from the substrate, forming an anti-reflection layer on a surface of the filling layer away from the wavelength conversion layer.

17. A wavelength conversion device, prepared by using the manufacturing method of the wavelength conversion device of claim 1.

18. The wavelength conversion device of claim 17, wherein the porosity of the entire wavelength conversion layer is 15%, 20%, or 25%.

19. The wavelength conversion device of claim 17, wherein the fluorescent material has a particle size of 5 μm to 30 μm, and the binding material has a particle size of 0.5 μm to 5 μm.

20. The wavelength conversion device of claim 17, wherein the wavelength conversion device further comprises a filling layer, and the filling layer is disposed on a surface of the wavelength conversion layer away from the substrate.

21. The wavelength conversion device of claim 20, wherein the filling layer has a porosity of less than 3% and a thickness of 3 μm to 15 μm.

22. The wavelength conversion device of claim 20, wherein the wavelength conversion device further comprises an anti-reflection layer, and the anti-reflection layer is disposed on a surface of the filling layer away from the wavelength conversion layer.

* * * * *